(12) United States Patent
Perez-Bonifacini

(10) Patent No.: US 6,417,449 B1
(45) Date of Patent: Jul. 9, 2002

(54) MODULAR HOLDER FOR CONDUIT AND JUNCTION BOXES

(76) Inventor: Raymond Perez-Bonifacini, 11618 Hazen, Houston, TX (US) 77072

( * ) Notice: Subject to any disclaimer, the term of this patent is extended or adjusted under 35 U.S.C. 154(b) by 0 days.

(21) Appl. No.: 09/910,578

(22) Filed: Jul. 19, 2001

Related U.S. Application Data
(60) Provisional application No. 60/219,193, filed on Jul. 19, 2000.

(51) Int. Cl.[7] ............................. F16B 7/00; H02B 3/22
(52) U.S. Cl. ..................... 174/58; 411/427; 411/295; 174/54
(58) Field of Search ............................. 174/60, 61, 54, 174/57, 58, 59, 40 R, 44; 248/58, 62; 411/295, 427, 389; 403/300, 301, 305, 306, 307

(56) References Cited

U.S. PATENT DOCUMENTS

| | | | | |
|---|---|---|---|---|
| 1,378,015 A | * | 5/1921 | Erickson | 403/307 |
| 1,497,398 A | * | 6/1924 | Axelson et al. | 403/305 |
| 1,576,677 A | * | 3/1926 | Scheibeler | 403/305 |
| 2,049,265 A | * | 7/1936 | Kinney | 403/307 |
| 2,064,440 A | * | 12/1936 | Meeker | 403/305 |
| 2,337,711 A | * | 12/1943 | Crake | 403/305 |
| 2,679,414 A | * | 5/1954 | Hornschuch | 403/307 |
| 3,415,552 A | * | 12/1968 | Howlett | 403/305 |
| 4,729,707 A | * | 3/1988 | Takahashi | 411/386 |
| 5,443,232 A | * | 8/1995 | Kesinger et al. | 248/62 |
| 5,690,445 A | * | 11/1997 | Wu | 403/307 |
| 5,965,845 A | * | 10/1999 | Reiker | 174/58 |
| 6,204,450 B1 | * | 3/2001 | Reiker | 174/58 |
| 6,328,499 B1 | * | 12/2001 | Reding et al. | 403/307 |

* cited by examiner

*Primary Examiner*—Dean A. Reichard
*Assistant Examiner*—Angel R. Estrada
(74) *Attorney, Agent, or Firm*—Kenneth A. Roddy

(57) ABSTRACT

A modular holder for suspending conduit and junction boxes from a support surface by a single hanger wire or threaded rod. The holder has an elongate body with a central threaded bore extending along a longitudinal axis and opposed flat ends, a first transverse threaded bore disposed intermediate the opposed ends extending through the body along an axis perpendicular to the longitudinal axis, and a second transverse bore disposed near one of the opposed ends extending through the body along an axis perpendicular to the longitudinal axis. The holder body may be suspended in a vertical position by a hanger wire looped through the second transverse bore or screwed onto the bottom end of a threaded rod whereby the lower end of the body is connected to a conduit hanger or a junction box. The hanger may also be suspended in a horizontal position by a hanger wire looped through the first transverse bore whereby its opposed ends may be connected to a pair of conduit hangers or junction boxes to support a pair of conduits or junction boxes in a laterally spaced position. One or more of the holders may also be threadedly engaged on the threaded rod in horizontal vertically spaced relation and their opposed ends connected with conduit hangers or junction boxes to support a plurality of conduits and/or junction boxes in a laterally and vertically spaced relation.

3 Claims, 4 Drawing Sheets

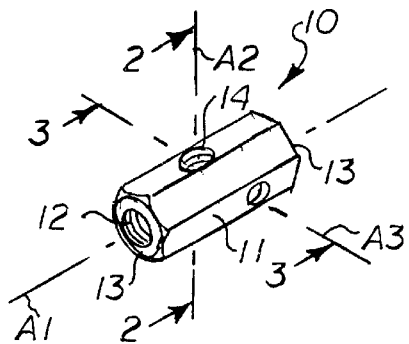
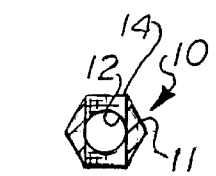
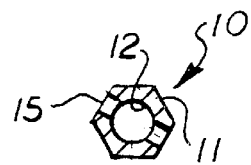
Fig. 1   Fig. 2   Fig. 3
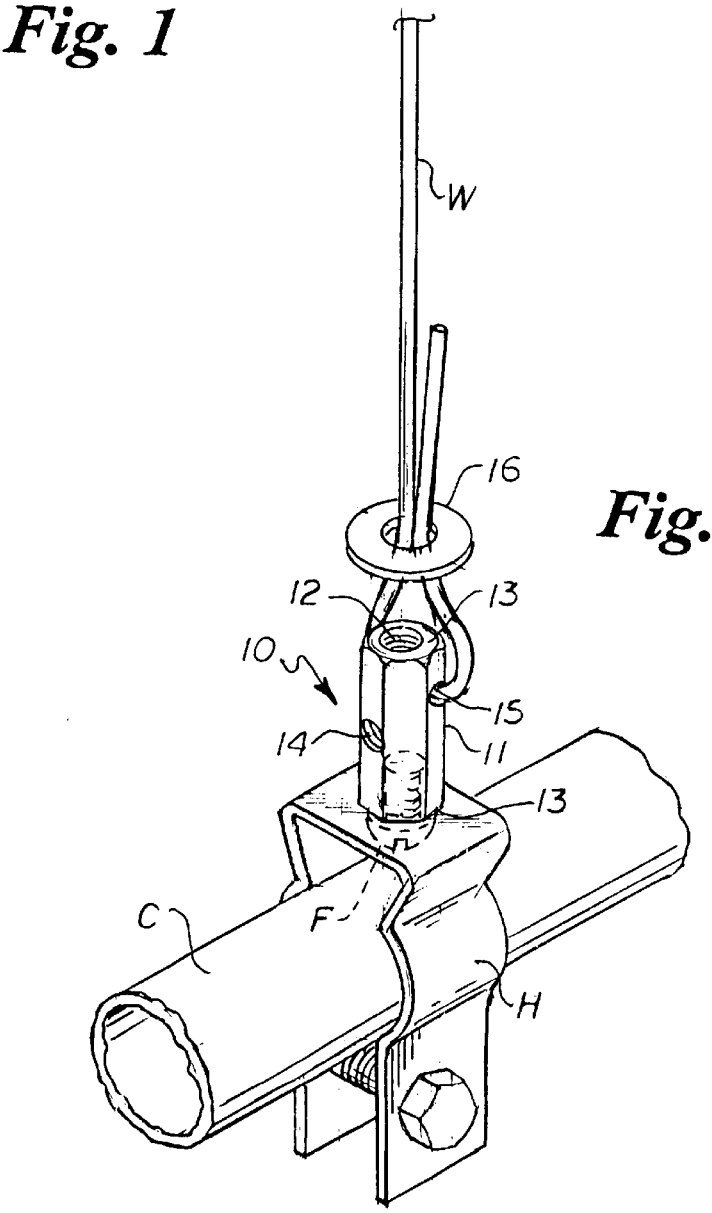
Fig. 4

MODULAR HOLDER FOR CONDUIT AND JUNCTION BOXES

This application claims the benefit of provisional application No. 60/219,193 filed Jul. 19, 2000.

BACKGROUND OF THE INVENTION

1. Field of the Invention

This invention relates generally to a system for holding or suspending electrical conduit and junction boxes. Specifically, this invention relates to a modular holder, whereby one or a plurality of conduits or junction boxes. can be easily and efficiently held or suspended from a support surface by a single hanger wire or threaded rod.

2. Brief Description of the Prior Art

During the construction of structures such as buildings, houses, etc., it is necessary to install large quantities of pipe, conduit, and electrical junction boxes in such structures. Piping, including PVC and metal piping, is necessary for plumbing. Electrical conduit and junction boxes are necessary to provide the electrical wiring from one point of the structure to another.

Normally, the pipe or conduit is supported against or suspended from a beam, wall or ceiling of the structure. Typical forms of attachment of the conduit, junction boxes or piping to the structure include brackets, wire hangers in the case of suspension, and clamps. In instances when more than one pipe or conduit is required to be installed at the same location, it is often difficult to join an additional pipe, conduit, or junction box to that already installed.

In the construction of suspended ceilings, electrical services are typically required to be hidden from view above the suspended ceiling. The suspended ceiling includes a steel or aluminum grid or lattice framework which supports individual ceiling tiles and is hung by metal rods, wire hangers, or ceiling wires that are fixed to an overhead support structure such as the main ceiling, which is usually made of concrete or steelwork. Typically, the lighting fixtures are fitted into the grid or tiles so that the ceiling presents a pleasant appearance and all of the electrical boxes, junction boxes, wiring and conduit, ductwork, and piping, etc., is hidden from public view, but easily accessible to workmen to carry out maintenance and alternations.

There are a number of devices in existence for supporting light fixtures and electrical boxes such as junction boxes in a suspended ceiling. Typically these devices have one or two supports that run beyond length of the ceiling panel to straddle the frame or extend between two Tee bars or the like to which the junction box is secured.

The present invention is distinguished over the prior art in general by a modular holder for suspending conduit and junction boxes from a support surface by a single hanger wire or threaded rod. The holder has an elongate body with a central threaded bore extending along a longitudinal axis and opposed flat ends, a first transverse threaded bore disposed intermediate the opposed ends extending through the body along an axis perpendicular to the longitudinal axis, and a second transverse bore disposed near one of the opposed ends extending through the body along an axis perpendicular to the longitudinal axis. The holder body may be suspended in a vertical position by a hanger wire looped through the second transverse bore or screwed onto the bottom end of a threaded rod whereby the lower end of the body is connected to a conduit hanger or a junction box. The hanger may also be suspended in a horizontal position by a hanger wire looped through the first transverse bore whereby its opposed ends may be connected to a pair of conduit hangers or junction boxes to support a pair of conduits or junction boxes in a laterally spaced position. One or more of the holders may also be threadedly engaged on the threaded rod in horizontal vertically spaced relation and their opposed ends connected with conduit hangers or junction boxes to support a plurality of conduits and/or junction boxes in a laterally and vertically spaced relation.

SUMMARY OF THE INVENTION

It is therefore an object of the present invention to provide a modular holder for conduit and junction boxes that allows one or a plurality of conduits or junction boxes to be suspended from a support surface by a single hanger wire or threaded rod.

It is another object of this invention to provide a modular holder for conduit and junction boxes that allows a combination of conduits and junction boxes to be suspended from a support surface by a single hanger wire or threaded rod.

Another object of this invention is to provide a modular holder for easily and quickly suspending conduit and junction boxes on a single hanger wire or threaded rod that does not require special tools.

A further object of this invention is to provide a modular holder for suspending conduit and junction boxes on a single hanger wire or threaded rod and allows the suspended conduit or junction boxes to be adjusted relative to a vertical and horizontal axis.

A still further object of this invention is to provide a modular holder for suspending conduit and junction boxes on a single hanger wire or threaded rod which is simple in construction and inexpensive to manufacture.

Other objects of the invention will become apparent from time to time throughout the specification and claims as hereinafter related.

The above noted objects and other objects of the invention are accomplished by a modular holder for suspending conduit and junction boxes from a support surface by a single hanger wire or threaded rod. The holder has an elongate body with a central threaded bore extending along a longitudinal axis and opposed flat ends, a first transverse threaded bore disposed intermediate the opposed ends extending through the body along an axis perpendicular to the longitudinal axis, and a second transverse bore disposed near one of the opposed ends extending through the body along an axis perpendicular to the longitudinal axis. The holder body may be suspended in a vertical position by a hanger wire looped through the second transverse bore or screwed onto the bottom end of a threaded rod whereby the lower end of the body is connected to a conduit hanger or a junction box. The hanger may also be suspended in a horizontal position by a hanger wire looped through the first transverse bore whereby its opposed ends may be connected to a pair of conduit hangers or junction boxes to support a pair of conduits or junction boxes in a laterally spaced position. One or more of the holders may also be threadedly engaged on the threaded rod in horizontal vertically spaced relation and their opposed ends connected with conduit hangers or junction boxes to support a plurality of conduits and/or junction boxes in a laterally and vertically spaced relation.

BRIEF DESCRIPTION OF THE DRAWINGS

FIG. 1 is an isometric view of a modular holder in accordance with the present invention.

FIG. 2 is a transverse cross section view of the holder, taken along line 2—2 of FIG. 1.

FIG. 3 is a transverse cross section view of the holder, taken along line 3—3 of FIG. 1.

FIG. 4 is a perspective view of the holder, shown suspended by a hanger wire in a vertical position and connected to a conduit hanger to support a single conduit in a generally horizontal position.

DESCRIPTION OF THE PREFERRED EMBODIMENT

Figure 5:
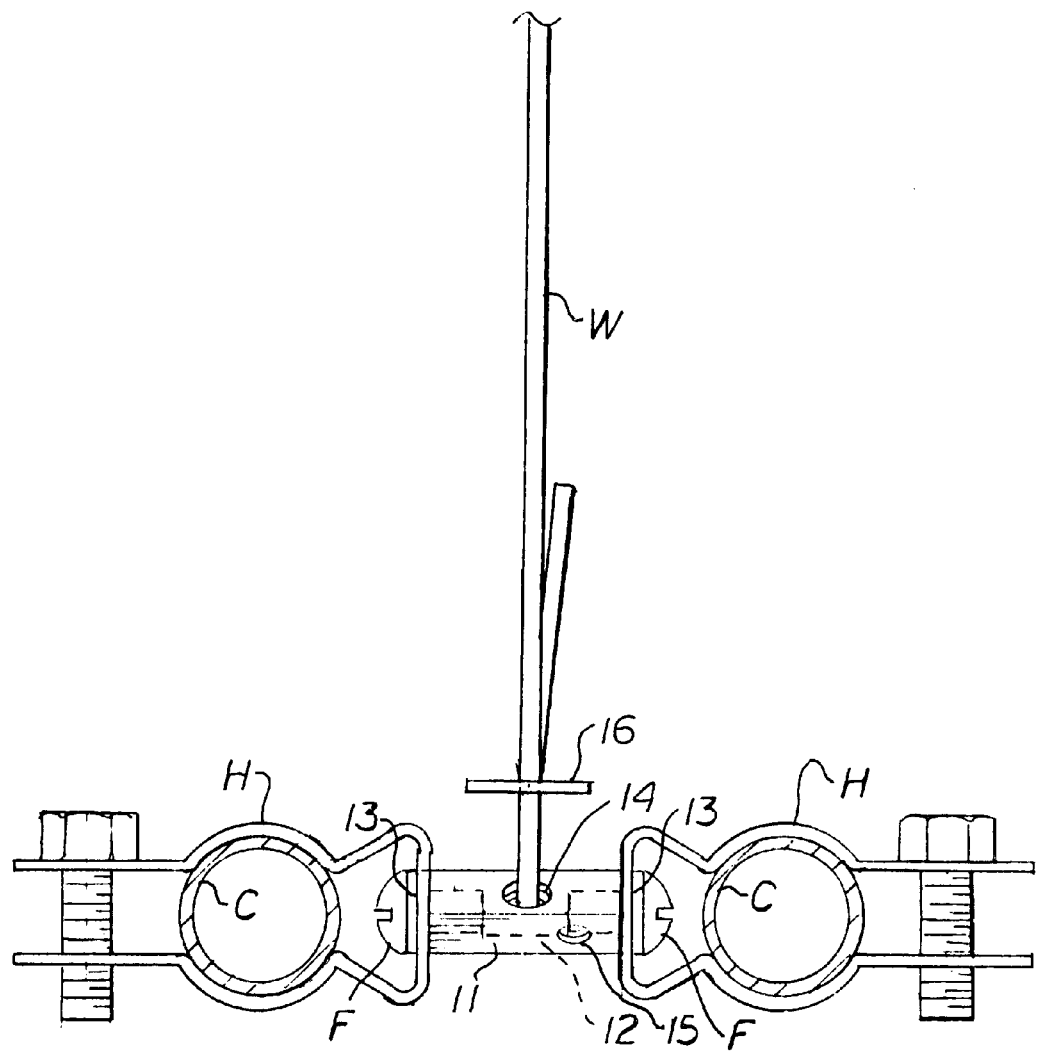
FIG. 5 is a side elevation view of the holder, shown suspended by a hanger wire in a horizontal position and connected to a pair of conduit hangers to support a pair of conduits in a generally horizontal laterally spaced position.

Referring now to the drawings by numerals of reference there is shown in FIGS. 1, 2 and 3, a preferred embodiment of a modular holder 10 in accordance with the present invention. The holder 10 has an elongate body 11 with a central threaded bore 12 extending along a longitudinal axis A1, and opposed flat ends 13. In the preferred embodiment, the body 11 is hexagonal in transverse cross section, however it should be understood, that the body may have other polygonal cross section configurations or may be cylindrical.

The body 11 is formed of a rigid lightweight material, preferably a metal such as stainless steel, but may alternatively be formed of any other suitable rigid, lightweight material.

The threads of the longitudinal threaded bore 12 are sized to threadedly engage the threads of a threaded rod and also a screw having the same size thread (described hereinafter). A first transverse bore 14 disposed intermediate the ends 13 extends through the body 11 along an axis A2 perpendicular to the longitudinal axis A1. In a preferred embodiment the transverse bore 14 is threaded with the same thread size as the threads of the longitudinal threaded bore 12. Thus, as described hereinafter, the holder 10 may be threadedly connected on the threaded rod in a vertical position via the central bore 12 or in a horizontal position via the transverse bore 14.

A second transverse bore 15 disposed near one of the ends 13 extends through the body 11 along an axis A3 perpendicular to the longitudinal axis A1. In a preferred embodiment the transverse bore 15 is sized to receive a conventional hanger wire commonly used in suspended ceiling construction. In a preferred embodiment, the axis A3 of the second transverse bore 15 is disposed in angularly offset relation to the axis A2 of the first transverse bore 14. As described hereinafter, the holder 10 may be suspended in a vertical position by looping the hanger wire through the transverse bore 15 disposed near one of the ends 13, or in a horizontal position by looping the hanger wire through the transverse threaded bore 15 at the center of the body 11.

FIG. 4 shows a holder 10 suspended by a hanger wire W in a vertical position. The upper end of the hanger wire W is secured to an overhead support structure or surface (not shown). The holder body 11 is connected at one end (the end opposite the end closest to the transverse bore 15) to a conduit hanger H by passing the threaded shank of a screw or bolt fastener F through a hole in the top portion of the hanger H and threadedly engaging it in the longitudinal threaded bore 12. A washer, such as a lock washer may be installed between the head of the fastener and the underside of the top portion of the conduit hanger H to firmly secure the conduit hanger H and holder 10 together. A washer 16 is slid onto the wire W and the lower end of the wire is looped through the transverse bore 15 near one of the ends 13 of the body 11 with the free end of the wire positioned generally vertically adjacent to the depending section of the wire. The washer 16 is then slid down over the vertical adjacent wire sections to maintain them in place.

A commercially available conduit hanger H suitable for use with the holder 10 is manufactured by Minerallac Fastening Systems, 466 Vista Avenue, Addison, Ill. 60101. Details of the conduit hanger H are disclosed in U.S. Pat. No. 4,479,625, which is hereby incorporated herein by reference to the same extent as if fully set forth herein. The conduit C is supported by the conduit hanger H in a generally horizontal position.

FIG. 5 shows a holder 10 suspended by a hanger wire W in a horizontal position. The upper end of the hanger wire W is secured to an overhead support structure or surface (not shown). In this example, the holder body 11 is connected at each end to a pair of conduit hangers H by positioning the hangers horizontally in opposed relation and passing the threaded shank of a screw or bolt fastener F through a hole in the top portion of each hanger and threadedly engaging it in the longitudinal threaded bore 12. A washer, such as a lock washer may be installed between the head of the fastener and the underside of the top portion of each conduit hanger H to firmly secure the conduit hangers H and holder 10 together. A washer 16 is slid onto the wire W and the lower end of the wire is looped through the transverse threaded bore 14 at the center of the body 11 with the free end of the wire positioned generally vertically adjacent to the depending section of the wire. The washer 16 is then slid down over the vertical adjacent wire sections to maintain them in place. A pair of conduits C are supported by the conduit hanger H in a generally horizontal laterally spaced position.

Figure 6:
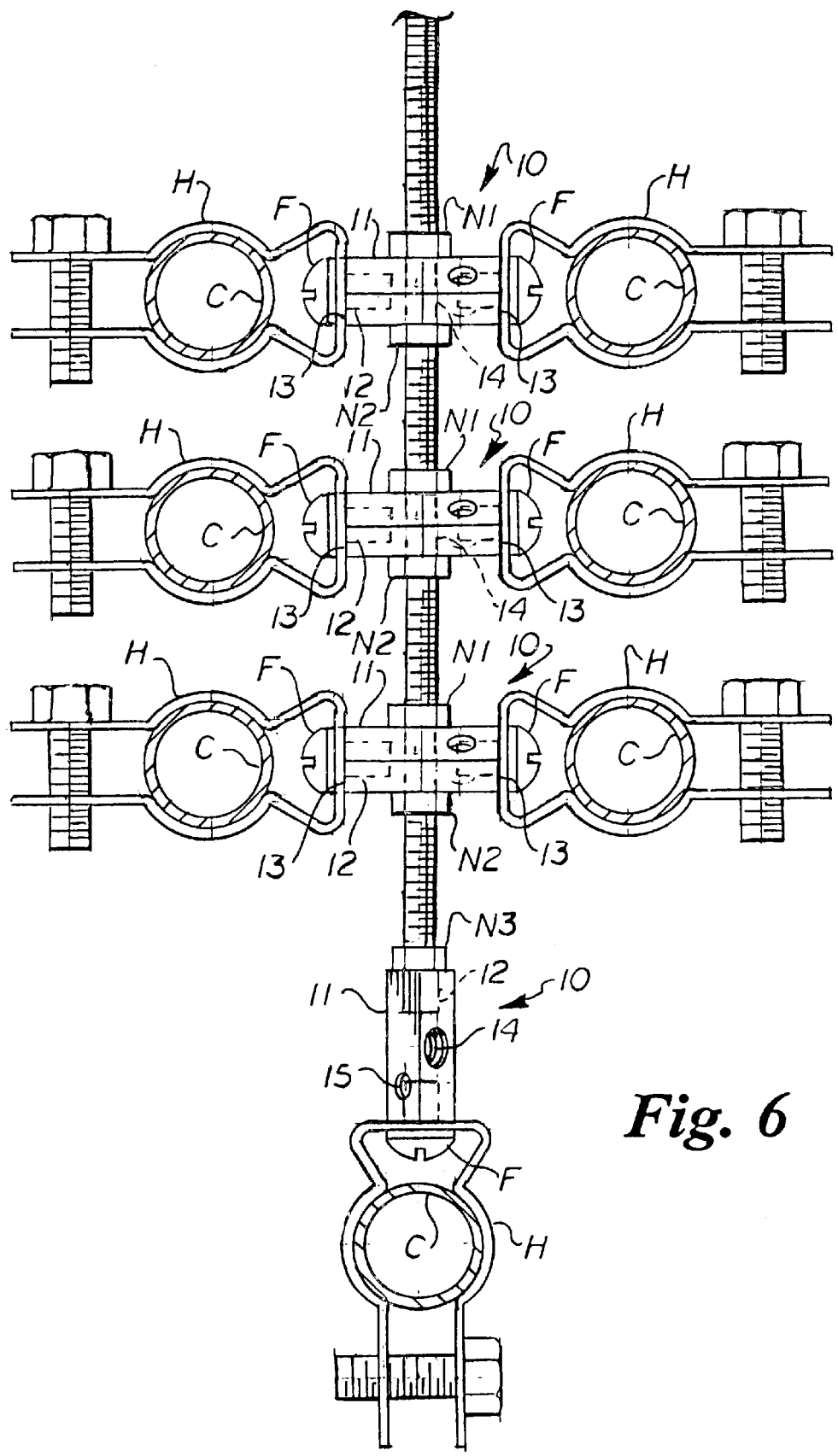
FIG. 6 is a side elevation view of a holder suspended by a threaded rod in a vertical position connected to a conduit hanger to support a single conduit in a generally horizontal position, and a plurality of holders connected on the threaded rod in horizontal vertically spaced relation each connected to a pair of conduit hangers to support pairs of conduits horizontally in a laterally and vertically spaced position.

FIG. 6 shows one holder 10 suspended at the lower end of a threaded rod R (commonly known as "allthread" rod) in a vertical position, and a plurality of the holders 10 connected on the threaded rod in horizontal vertically spaced relation. The upper end of the rod R is secured to an overhead support structure or surface (not shown). Each of the horizontally positioned holder bodies 11 is connected at each end 13 to a pair of conduit hangers H by positioning the hangers horizontally in opposed relation and passing the threaded shank of a screw or bolt fastener F through a hole in the top portion of each hanger and threadedly engaging it in the longitudinal threaded bore 12. A washer, such as a lock washer may be installed between the head of the fastener and the underside of the top portion of each conduit hanger H to firmly secure the conduit hangers 14 and holder 10 together.

An upper lock nut N1 is screwed onto the threaded rod R and positioned at an upper end of the threaded rod R. A first one of the holder bodies 11 is positioned horizontally with the transverse threaded bore 14 at the center of the body positioned at the lower end of the threaded rod R and is screwed onto the threaded rod R to become positioned beneath the upper lock nut N1. A lower lock nut N2 is screwed onto the threaded rod R and positioned beneath the first horizontally positioned holder body 11. This process is repeated with each of the horizontally positioned holder bodies 11. A lowermost lock nut N3 is screwed onto the threaded rod R and positioned a distance above the bottom end of the threaded rod R.

The lowermost holder body 11 is positioned vertically and connected at its bottom end to the top portion of a vertically positioned conduit hanger H in the manner described above. The lowermost holder body 11 then is positioned vertically with its longitudinal threaded bore 12 positioned at the bottom end of the threaded rod R and is screwed onto the threaded rod R.

The holders 10 may be adjusted vertically on the threaded rod R for correct positioning, and then the lock nuts N1 and N2 are tightened against the exterior of the respective horizontally positioned bodies 11 and the lowermost lock nut N3 is tightened against the top end 13 of the vertically positioned lowermost holder body 11. Thus a plurality of conduits C may be supported by the conduit hangers H generally horizontally in laterally and vertically spaced positions.

It should be understood that each of the conduit hangers H may be rotated about the longitudinal axis A1 of the holder bodies 11, and that the holder bodies may be rotated about the longitudinal axis of the threaded rod R prior to locking them into position.

Figure 7:
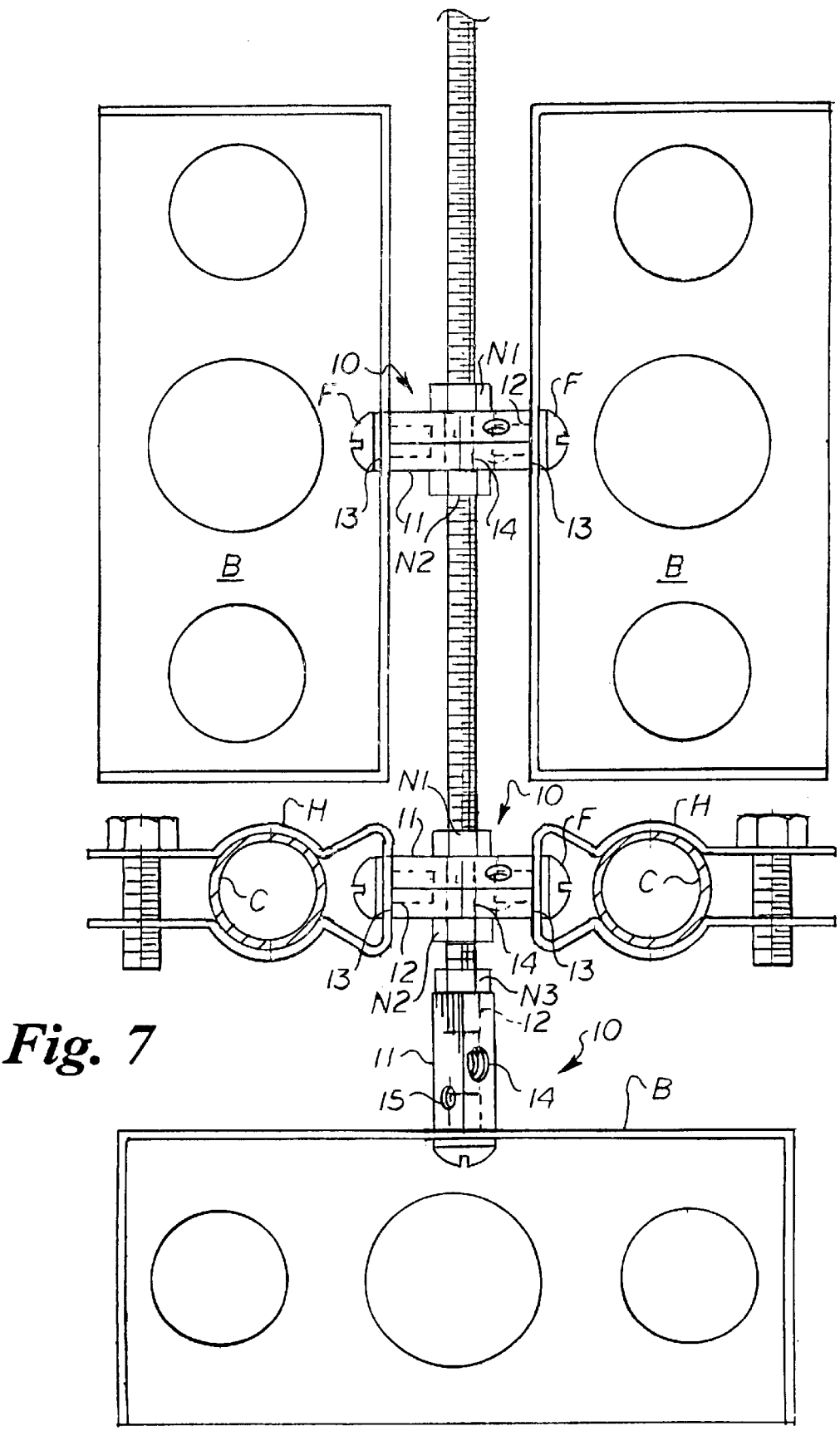
FIG. 7 is a side elevation view of a holder suspended by a threaded rod in a vertical position connected to a junction box to support a single junction box in a generally horizontal position, a second holder connected on the threaded rod in a horizontal position connected to a pair of junction boxes to support them vertically in a laterally spaced position, and a third holder connected on the threaded rod in a horizontal position connected to a pair of conduit hangers to support a pair of conduits horizontally in a laterally spaced position.

FIG. 7 shows a lowermost holder 10 suspended at the lower end of a threaded rod R in a vertical position supporting a junction box B, an intermediate holder 10 connected on the threaded rod in a horizontal position supporting a pair of conduits C, and an upper holder 10 connected on the threaded rod in a horizontal position supporting a pair of laterally spaced junction boxes B.

In this example, the upper horizontally positioned holder bodies 11 is connected at each end 13 to a pair of junction boxes B by positioning the junction boxes with their bottom wall in horizontally opposed relation and passing the threaded shank of a screw or bolt fastener F through a hole in the bottom wall of each junction box and threadedly engaging it in the longitudinal threaded bore 12. A washer, such as a lock washer may be installed between the head of the fastener and the inside surface of each junction box B to firmly secure the Junction boxes B and holder 10 together. It should be understood that the junction boxes B may alternatively be secured to the holder body 10 by a hole in their side wall rather than the bottom wall.

The intermediate horizontally positioned holder body 11 is connected at each end 13 to a pair of conduit hangers H by positioning the hangers horizontally in opposed relation and passing the threaded shank of a screw or bolt fastener F through a hole in the top portion of each hanger and threadedly engaging it in the longitudinal threaded bore 12. A washer, such as a lock washer may be installed between the head of the fastener and the underside of the top portion of each conduit hanger H to firmly secure the conduit hangers H and holder 10 together.

An upper lock nut N1 is screwed onto the threaded rod R and positioned at an upper end of the threaded rod R. The upper holder body 11 is positioned horizontally with the transverse threaded bore 14 at the center of the body positioned at the lower end of the threaded rod R and is screwed onto the threaded rod R to become positioned beneath the upper lock nut N1. A lower lock nut N2 is screwed onto the threaded rod R and positioned beneath the upper horizontally positioned holder body 11. A second upper lock nut N1 is screwed onto the threaded rod R and positioned beneath the first lower lock nut N2. The intermediate holder body 11 is positioned horizontally with its transverse threaded bore 14 at the center of the body positioned at the lower end of the threaded rod R and is screwed onto the threaded rod R to become positioned beneath the second upper lock nut N1. A second lower lock nut N2 is screwed onto the threaded rod R and positioned beneath the intermediate horizontally positioned holder body 11.

A lowermost lock nut N3 is screwed onto the threaded rod R and positioned a distance above the bottom end of the threaded rod R. The lowermost holder body 11 is positioned vertically and connected at its bottom end to the bottom wall (or side wall) of a lowermost junction box B as described above. The lowermost holder body 11 then is positioned vertically with its longitudinal threaded bore 12 positioned at the bottom end of the threaded rod R and is screwed onto the threaded rod R.

The holders 10 may be adjusted vertically on the threaded rod R for correct positioning, and then the lock nuts N1 and N2 are tightened against the exterior of the respective horizontally positioned bodies 11 and the lowermost lock nut N3 is tightened against the top end 13 of the vertically positioned lowermost holder body 11. Thus, a plurality of junction boxes B and conduits C may be supported by the holders 10 and conduit hangers H, respectively, generally horizontally in laterally and vertically spaced positions.

It should be understood that each of the junction boxes B and conduit hangers H may be rotated about the longitudinal axis A1 of the holder bodies 11, and that the holder bodies may be rotated about the longitudinal axis of the threaded rod R prior to locking them into position.

While this invention has been described fully and completely with special emphasis upon preferred embodiments, it should be understood that within the scope of the appended claims the invention may be practiced otherwise than as specifically described herein.

What is claimed is:

1. A holder for suspending conduit and junction boxes from a support surface by a single hanger wire or threaded rod, comprising:
    an elongate body having a central threaded bore extending along a longitudinal axis and opposed flat ends; and
    a first transverse bore disposed intermediate said ends extending through said body along an axis perpendicular to said longitudinal axis; wherein
        said first transverse bore is adapted to slidably receive a hanger wire looped therethrough for supporting said body thereon in a horizontal position; and
        said central threaded bore is adapted to threadedly engage a threaded shank of a fastener at each of said opposed ends, respectively for selectively connecting either of a conduit hanger or a junction box to said opposed ends in laterally spaced relation.

2. The holder according to claim 1, wherein
    said first transverse bore is threaded to threadedly engage a vertically positioned threaded rod for supporting said body thereon in a horizontal position.

3. The holder according to claim 1, further comprising
    a second transverse bore disposed near one of said opposed ends extending through said body along an axis perpendicular to said longitudinal axis adapted to slidably receive a hanger wire looped therethrough for supporting said body thereon in a vertical position; and
    said central threaded bore is adapted to threadedly engage a threaded shank of a fastener at the remaining said opposed end for selectively connecting either of a conduit hanger or a junction box to said remaining opposed end.

* * * * *